Patented July 1, 1941

2,247,400

UNITED STATES PATENT OFFICE 2,247,400

METHOD OF PREPARING A HIGH MELTING, STABLE ROSIN PRODUCT AND THE PRODUCT MADE THEREBY

Robert C. Palmer and Carlisle H. Bibb, Pensacola, Fla., assignors to Newport Industries, Inc., Pensacola, Fla., a corporation of Delaware No Drawing. Application November 16, 1938, Serial No. 240,644

6 Claims. (Cl. 260—100)

This invention relates to a method of preparing a high melting, stable rosin product and to the product so prepared. More particularly this invention relates to a process for hydrogenating a polymerized or partially polymerized rosin to increase its stability toward oxidation.

In our copending application, entitled "Method of polymerizing rosin and product made thereby," Serial No. 232,078, filed September 28, 1938, of which this is continuation-in-part, we have disclosed various methods of increasing the melting point of rosin, either wood or gum, by subjecting the rosin to the action of zinc chloride to produce a product known as partially polymerized, partially disproportionated abietic acid, i. e. containing, in admixture, both dehydro- and dihydro-abietic acids together with polymerized abietic acid.

We have now found that stability toward oxygen of the polymerized, or partially polymerized rosin may be further increased by hydrogenation. While hydrogenated rosin cannot be polymerized as the double bonds are now occupied by hydrogen, a polymerized or partially polymerized rosin is, however, still largely unsaturated, even though the polymerization process produces a certain amount of hydrogenation and corresponding dehydrogenation. A polymerized or partially polymerized rosin may, therefore, be treated with hydrogen by any one of well-known processes to give a product having an even greater commercial value. This is particularly true in the protective coating and soap industries where the hardness due to polymerization has thereby the added property of stability against oxidation.

We may take any of the polymerized or partially polymerized rosins (wood or gum) described in our copending application, Serial No. 232,078, filed September 28, 1938, and subject it to hydrogenation. As an example, we may take the partially polymerized rosin having a capillary melting point of 76 to 78° C., acid value 165, color N to WG, place it in a vessel and subject it to a temperature of 150 to 265° C. in the presence of hydrogen under pressure, which may be between 200 and 15,000 lbs. per square inch and an active base metal hydrogenation catalyst until the remaining double bonds in the rosin have been saturated to the extent of 50% or more.

Alternatively, instead of hydrogenating the polymerized or partially polymerized rosin in a batch process, we may conduct the hydrogenation in a continuous process by flowing the liquid rosin under pressure and at elevated temperature over a suitable catalyst in the presence of hydrogen. The so-called Raney catalysts are particularly suited to this type of hydrogenation. The temperature may range from 70 to 230° C., and the pressure from 100 to 5,000 lbs. per square inch. A neutral solvent, such as petroleum naphtha or other solvent, may be employed which favors the lower temperatures and pressures.

If desired or necessary, the hydrogenated rosin may be further refined to remove color bodies or to separate catalyst or rosin compounds with the catalyst. The polyabietic acid in polymerized rosin cannot be vacuum distilled, but may be treated with selective solvents, or fuller's earth, or acids to remove metal compounds or any combination of such treatments that have a beneficial effect on the visible color or the rosin. Any portion of the rosin which has not been polymerized can, however, be separated by vacuum distillation from the polymerized portion.

The following will serve to illustrate a preferred embodiment of our invention, in accordance with which rosin is first polymerized and then hydrogenated:

Example 1

9600 pounds of WW wood rosin are dissolved in 770 gals. of petroleum solvent boiling between 105 and 140° C. to give a 66% solution of rosin by weight.

The rosin solution so prepared is first dehydrated. This may be accomplished by placing the solution in a still provided with a reflux condenser and a trap for catching any water found to be present in the distillate. The refluxing operation is carried out until only the merest trace of water is left in the solution. The solution is then allowed to cool somewhat to below its boiling point of 132° to 134° C., and 144 lbs. of dry "technical granular" zinc chloride are added slowly in order to avoid undue boiling and subsequent danger of the solution surging over the top of the containing vessel.

Since exposure of zinc chloride to humid air causes it to pick up considerable moisture, such exposure of the zinc chloride prior to actual use is to be avoided.

The amount of zinc chloride added corresponds with 1½% by weight of the rosin undergoing treatment. With this percentage of catalyst, best results are obtained by carrying out the reaction for 12 to 16 hours. The reaction time will vary somewhat with the proportion of catalyst used.

The temperature of the reaction mass during the entire period is kept at about 128 to 138° C., or just under the boiling point of the solution.

At the end of the reaction time, the hot rosin solution is washed as follows, maintaining the washes as well as the rosin solution at about 75° to 80° C.:

| Wash | Volume |
|---|---|
| 1st | 400 gals. water. |
| 2nd | 120 gals. 1.5% sulfuric acid. |
| 3rd | 400 gals. water. |
| 4th | Do. |
| 5th | Do. |

Any undissolved zinc chloride and traces of "tarry" matter dissolve in the first wash water. The fifth wash should be free of zinc compounds but washing should be carried out until tests show the absence of zinc compounds and also the absence of chlorides and sulfates.

The washing step is preferably carried out in the reaction vessel by mechanical agitation. Since the solution contains no emulsifying agents, the water settles out rapidly upon cessation of the agitation.

The washed rosin solution is next transferred to a suitable still, where the solvent is evaporated off by passing dry steam through the solution in the still. Final steaming at 210° to 220° C. still temperature is recommended. It is possible to use lower finishing temperatures, but the rosin is quite viscous even at 180° C. with the higher melting types resulting from the polymerization reaction. To obtain the desired melting point of 76° to 77° C., it is necessary that all traces of solvent be steamed off of the rosin.

The foregoing process has readily produced a rosin of the following properties:

| | |
|---|---|
| Color | WG |
| Melting point | 75° to 80° C. |
| Acid value | 164 to 167 |
| Rotation | −4 to −8 |
| Ash | Less than 0.01% |

In stating the melting point of rosin or any of the rosin products described herein, it will be understood that such melting points have been determined by the capillary tube method. For the sake of comparison, however, the following relationship exists between the capillary tube method and the so-called drop method, referred to in the Schnorf Patent No. 2,074,192:

76° C. (drop) equals 52° capillary tube
76° C. capillary tube equals 100° C. drop method Higher melting point rosin is obtainable at the expense of using more catalyst and at a sacrifice in color grade and a lowering of acid value. The reaction time can be shortened to from 4 to 8 hours by increasing the proportion of catalyst used to a maximum of 3%, and the color grade can be maintained under these conditions. In general, however, longer time of reaction with any given amount of catalyst tends to give a higher melting point, lower grade and lower acid value in the polymerized product. 1½% of catalyst is the practical minimum in any case.

Hot water is recommended in the washing operation because in view of the high rosin concentration it is obviously necessary that the rosin solution be kept fluid. As an alternative procedure, the rosin solution at the end of the reaction may be diluted and the washing conducted with hot or cold water.

A partially polymerized rosin produced by the process just described is next placed in an autoclave and subjected to a temperature of 150 to 265° C. in the presence of hydrogen under a pressure of 2,000 to 5,000 lbs. per square inch and an active nickel hydrogenation catalyst. The treatment is continued for several hours, or until at least 50% of the double bonds remaining after the polymerization step have been saturated.

The resulting product will be found to have greater stability toward oxidation than the intermediate polymerized or partially polymerized rosin product before hydrogenation.

While, as stated above, hydrogenated rosin cannot be polymerized, a partially hydrogenated rosin may be. Alternatively, therefore, we may take rosin, wood or gum, and subject it to only partial hydrogenation by any of the methods described above and then subject it to polymerization by the processes described in our copending Serial No. 232,078 as a catalyst, or we may use other polymerizing catalysts such as sulfuric acid or borontrifluoride. The advantage of starting with a partially hydrogenated rosin is that no subsequent refining steps are necessary as may be the case where a partially polymerized rosin is later subjected to hydrogenation.

We are aware that numerous details of the process may be varied through a wide range without departing from the principles of this invention, and we therefore do not purpose limiting the patent granted hereon otherwise than necessitated by the prior art.

We claim as our invention:

1. The method of producing a relatively high melting point rosin product, which comprises polymerizing rosin and nuclearly hydrogenating the resulting polymerized rosin.

2. The method of producing a relatively high melting point rosin product, which comprises polymerizing rosin by heating the rosin in the presence of zinc chloride under anhydrous conditions and maintaining such conditions throughout the entire heating step and nuclearly hydrogenating the resulting polymerized rosin.

3. The method of producing a relatively high melting, stable rosin product, which comprises subjecting a polymerized disproportionated rosin to hydrogen under the action of heat, pressure and a hydrogenation catalyst to nuclearly hydrogenate said polymerized rosin.

4. The method of producing a relatively high melting point rosin product, which comprises polymerizing rosin and hydrogenating the resulting polymerized rosin until the double bonds remaining after polymerization have been reduced by at least 50%.

5. A relatively high melting stable nuclearly hydrogenated polymerized rosin.

6. A relatively high melting nuclearly hydrogenated polymerized rosin having not more than 50% of the double bonds present in polymerized unhydrogenated rosin.

ROBERT C. PALMER.
CARLISLE H. BIBB.